Oct. 28, 1969  C. J. HUGGINS  3,474,524
PREPARATION OF FILAMENTARY TEST SAMPLES
Filed Nov. 4, 1965
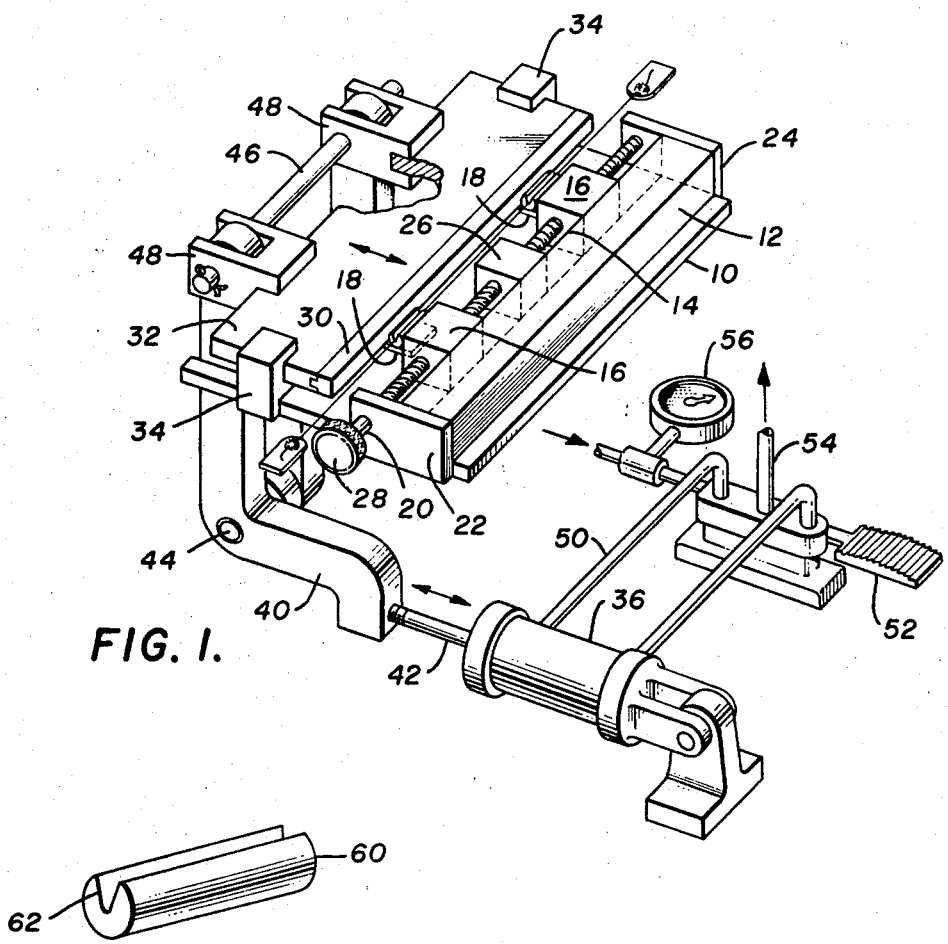
FIG. 1.
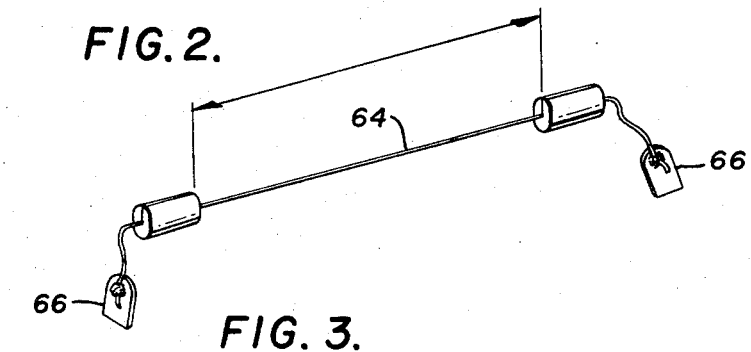
FIG. 2.
FIG. 3.
INVENTOR.
CLYDE J. HUGGINS
BY
Roy H. Messengill
ATTORNEY

United States Patent Office 3,474,524
Patented Oct. 28, 1969

3,474,524
PREPARATION OF FILAMENTARY TEST SAMPLES
Clyde J. Huggins, Cary, N.C., assignor to Monsanto Company, St. Louis, Mo., a corporation of Delaware
Filed Nov. 4, 1965, Ser. No. 506,327
Int. Cl. B21d 39/00
U.S. Cl. 29—505                                3 Claims

ABSTRACT OF THE DISCLOSURE

A method of preparing a filament for testing in an Instron tester includes the placement of a pair of slotted members in alignment with each other, the positioning of a filament in the slotted members and the swaging of the slotted members around the filament.

---

The present invention relates to a fiber test procedure employed to determine the physical properties of fibers. More particularly, the invention relates to an improved method of preparing fiber samples preliminary to testing which facilitates easier handling and produces a more uniform test.

In the successful production of synthetic fibers, a fiber testing program for evaluating the quality of the fibers is essential. The advancements made by fiber science technology toward improving the quality of the man-made fibers have been substantial in recent years. Fiber properties are altered by subjecting them to treatment processes such as drawing, crimping, annealing, texturing, bulking and the like, which are carried out under controlled conditions. The amount of time and expense devoted to the improvement of the quality of the synthetic fibers is considerable. Therefore, the success of continued efforts directed toward fiber quality improvement is dependent upon the ability to accurately analyze the data provided from an efficient method for testing fiber properties such as elongation, tenacity, etc.

The several methods employed heretofore in preparing fiber test samples for handling and testing have been quite tedious and time consuming. Generally, the fibers are provided with end tabs to facilitate handling prior to testing and during the test. In order to test the fibers for breaking strength in an Instron tester they must be clamped by means which can be attached to the Instron. If the fibers are clamped too loosely they will pull out, and when clamped too tightly breaking will occur in the immediate vicinity of the clamp thus rendering the test ineffective. Presently, clamping is accomplished either by two members having intermeshing jaws secured together by threaded fasteners, or spring biased jaws which always exert a constant amount of force. A major disadvantage experienced with the screw clamps is the time consumed in adjusting the screws and the guess work involved in tightening the screws adequately to provide the proper amount of compression on the delicate fiber being tested. The principal disadvantage with the spring-biased clamps is the inability to adjust the gripping power whether a delicate 1 denier fiber or 500 denier tire cord is being tested. An apparent disadvantage common to both of the general-type clamps now employed is that reproducible results cannot always be obtained since the compressive forces exerted by the jaws of the clamps are not precisely controlled and there is no means provided for aligning the fiber ends with the longitudinal forces exerted on the length of fiber being tested to insure uniform results. Furthermore, the conventional clamps employed for retaining fibers being tested in a heated environment slow down the testing operation because of the heat loss which occurs each time the bulky clamps are removed from the heated chamber.

With the foregoing problems in mind, it is an object of the present invention to provide a method of preparing fiber test samples which eliminates a great portion of the tedious and time consuming efforts now required. Another object of the invention is to provide a method of readying fibers for testing of their physical properties in which inexpensive, disposable retaining members are clamped on separate portions of the test fiber sample with the same degree of snugness. A further object is to provide apparatus for carrying out the process of the present invention which has means for selectively controlling the amount of compression on the clamped portions of fiber automatically in an accurate and uniform manner. Still another object of the invention is to provide a test fiber sample having two disposable clips swaged around separate portions thereof to facilitate testing the physical properties of said fiber. Other objects and advantages of the invention will be apparent from the drawing and description which follow.

FIGURE 1 is a pictorial view of the apparatus employed to compress the metal clips on separate portions of a fiber sample prior to testing;

FIGURE 2 shows the end and side view of one type clip which may be used with the invention; and FIGURE 3 shows a test fiber sample which has been prepared for testing by the method of this invention illustrating the fiber clamped in a pair of clips of the type shown in FIGURE 2.

With continued reference to the drawing and more particularly FIGURE 1, there is shown a base member 10 in the form of a plate which is suitable for attachment to a workbench. A rectangular member 12 is secured to the upper side of base member 10, preferably by welding, to provide an inwardly facing shoulder 14. Two anvils 16 rest on the surface of base member 10 in contiguous alignment with the shoulder 14. A gauging screw 20, which is supported at each end thereof by flanges 22 and 24 extending upwardly from the base member 10, is employed to adjust the position of the anvils with respect to each other. The gauging screw passes through a threaded bore in a support block 26 which divides the screw threaded gauging member 20 into two sections of equal length having oppositely threaded surfaces. The anvils 16 are provided with a centrally disposed bore having internal threads corresponding to the gauging screw threads with an anvil properly positioned on each section of the adjustment member. A hand wheel 28 is secured on one end of the gauging screw for easy rotation thereof to selectively space apart the anvils. The anvils 16 may be moved laterally along the entire length of the threaded portions of the gauging screw, but the forward surface of each relative to shoulder 14 occupy the same vertical plane. The anvils are provided with a thin member 18 for supporting a clip in alignment with each other. If desired the upper surface of the support member 18 may be provided with a resilient slot for retaining the clips in place while a filament is being clamped within said clips.

Opposing the faces of the anvils 16 is a hammer 30 having a planer face which is parallel to the anvil faces. The hammer 30 is carried by a plate-like member 32 which is spaced above base member 10 and guided substantially parallel therewith by a guide member 34 at each end thereof. In the embodiment shown, the hammer is advanced toward the anvils by a conventional pneumatically operated cylinder 26 which is operably connected to a pivotal arm 40 with a connecting rod 42. The arm 40 is pivoted on a pin 44 in the center thereof and connected to member 32 on a shaft 46 journalled in bearings 48 so that reciprocation of rod 42 causes member 32 to shift back and forth in the guide members 34 to control the movement of hammer 30. The air cylinder 36 is operated by a source of air from a supply, not shown, which enters the cylinder through conduit 50 when foot pedal 52 is pressed downwardly. Upon release of the foot pedal the air is exhausted through the outlet conduit 54. A pressure regulator 56 is provided for controlling the operating pressure of the air cylinder 36.

In accordance with the present invention the method is carried out by the operator placing a clip 60, as shown in FIGURE 2, with the open side up on each of the clip holders 18 and then depositing a length of test filament 64 into the groove 62 of the clip in an extended state. Preferably, the filament should have a small tab 66 glued or tied to each end thereof to facilitate faster handling. The operator presses the foot pedal to actuate the pivoted arm 40 to shift hammer 30 against the clips. To insure that proper alignment of the clips with respect to each other is achieved, the filament should be held taut until the clips are tightly swaged around said filament. The pressure regulator 56 should be preset to limit the amount of pressure exerted on the clips so that the proper selection can be made depending upon the particular filament being tested. Once the choice has been made, the pneumatically controlled actuator may be operated continuously to impose a constant, predetermined amount of force on the clips and thereby provide uniform conditions which are quite critical in an effective program designed to evaluate the physical properties of filamentary materials.

The clips employed with this invention are preferably cast from an inexpensive metal alloy which is rather malleable and easy to swage. In instances where the filamentary materials to be tested are heat treated and have high melting temperatures, the clips necessarily must be made of materials which will withstand the required temperatures. Preferably the clips will be made from a metallic material attractable to magnetic forces so that magnetic holders can be employed in the testing machine to reduce the handling time required with other types of equipment for holding the test sample during testing. After the test specimen or sample has been removed from the testing apparatus, the inexpensive clips may be discarded.

The invention has been described generally for application in the textile industry, but there are many other material handling problems imposed by materials such as metal and glass filaments, tapes, films and the like which the invention is likewise applicable.

It will be apparent to those skilled in the art that the present invention provides a method for preparing and testing filamentary materials in a more expedient manner. The present method eliminates almost entirely the tedious and time consuming guess work required heretofore and thus provides a cheaper and more efficient method.

One embodiment has been shown for purposes of illustrating the present invention although it is obvious that modification thereto or other embodiments may be made without departing from the teachings thereof. Accordingly, it is intended that the invention be limited only to the scope of the appended claims.

What is claimed is:

1. A method of swaging a pair of slotted members around a filament to provide means thereon which facilitates the subsequent testing of the physical properties of said filament in an Instron tester or the like, which comprises:
    (a) positioning the slotted members in alignment with each other along a common axis,
    (b) placing in said slotted members a filament to be tested,
    (c) swaging the slotted members around the filament with a predetermined amount of pressure being applied under automatically controlled conditions, and
    (d) removing said applied pressure from the resulting swaged slotted members.

2. The method of claim 1 in which the filament is aligned in the slots along the common axis of the slotted members.

3. The method of claim 2 wherein a pair of tabs are respectively adhered to the ends of said filament so as to facilitate the handling of said filament while placing the same in said slotted members.

References Cited

UNITED STATES PATENTS

| | | | |
|---|---|---|---|
| 2,502,860 | 4/1950 | Leithiser | 29—505 |
| 2,520,786 | 8/1950 | Scott | 73—95 |
| 3,323,357 | 6/1967 | Gloor | 73—103 |
| 3,324,713 | 6/1967 | Krock et al. | 73—103 |

JOHN F. CAMPBELL, Primary Examiner

R. B. LAZARUS, Assistant Examiner

U.S. Cl. X.R.

73—95.5, 103